United States Patent [19]

Langli

[11] Patent Number: 4,852,294

[45] Date of Patent: Aug. 1, 1989

[54] STRIKE TRAP FOR CATCHING MICE AND RATS

[76] Inventor: Ola K. Langli, N-6650 Surnadal, Norway

[21] Appl. No.: 113,388

[22] PCT Filed: May 6, 1985

[86] PCT No.: PCT/NO85/00024

§ 371 Date: Jan. 6, 1986

§ 102(e) Date: Jan. 6, 1986

[87] PCT Pub. No.: WO85/05007

PCT Pub. Date: Nov. 21, 1985

Related U.S. Application Data

[63] Continuation of Ser. No. 824,004, Jan. 6, 1986, abandoned.

[30] Foreign Application Priority Data

May 7, 1984 [NO] Norway .................................. 841815

[51] Int. Cl.4 ............................................. A01M 23/30
[52] U.S. Cl. ......................................... 43/81; 43/81.5; 43/82
[58] Field of Search .................... 43/61, 81, 82, 81.5, 43/83, 77, 85

[56] References Cited

U.S. PATENT DOCUMENTS

| | | | |
|---|---|---|---|
| 613,304 | 11/1898 | Piggott | 43/81 |
| 871,989 | 11/1907 | Gates | 43/82 |
| 995,733 | 6/1911 | Stilson | 43/81 |
| 998,047 | 7/1911 | Stilson | . |
| 1,039,878 | 10/1912 | Anderson | . |
| 1,080,623 | 12/1913 | Brorby | 43/81 |
| 1,232,403 | 7/1917 | Speed | 43/81 |
| 1,376,554 | 5/1921 | Lange | 43/81 |
| 1,657,976 | 1/1928 | Soucy | . |
| 2,257,246 | 9/1941 | Rudolph | . |
| 2,574,322 | 11/1951 | Fitzsimons | 43/81 |
| 3,045,384 | 7/1962 | Gruschow et al. | 43/81.5 |
| 4,158,929 | 6/1979 | Custard | 43/61 |
| 4,306,370 | 12/1981 | Lindblad | 43/82 |
| 4,578,893 | 4/1986 | Wickenberg | 43/81 |
| 4,665,644 | 5/1987 | Vajs et al. | 43/82 |

Primary Examiner—Kurt Rowan
Attorney, Agent, or Firm—James E. Pittenger

[57] ABSTRACT

A trap is provided for the extermination of rodents. A spring-loaded striker is maintained in a raised, loaded position by a release lever connectable with the striker through a projection and lug arrangement. A bottom opening is provided in the trap which receives the bait therein. The release lever is placed forwardly of the bait and in the path of movement of the rodent. The striker is mounted for arcuate movement. When a rodent engages the release lever, the striker and the release lever disengage thereby permitting the striker to rotate in an arcuate path to strike the rodent.

4 Claims, 4 Drawing Sheets

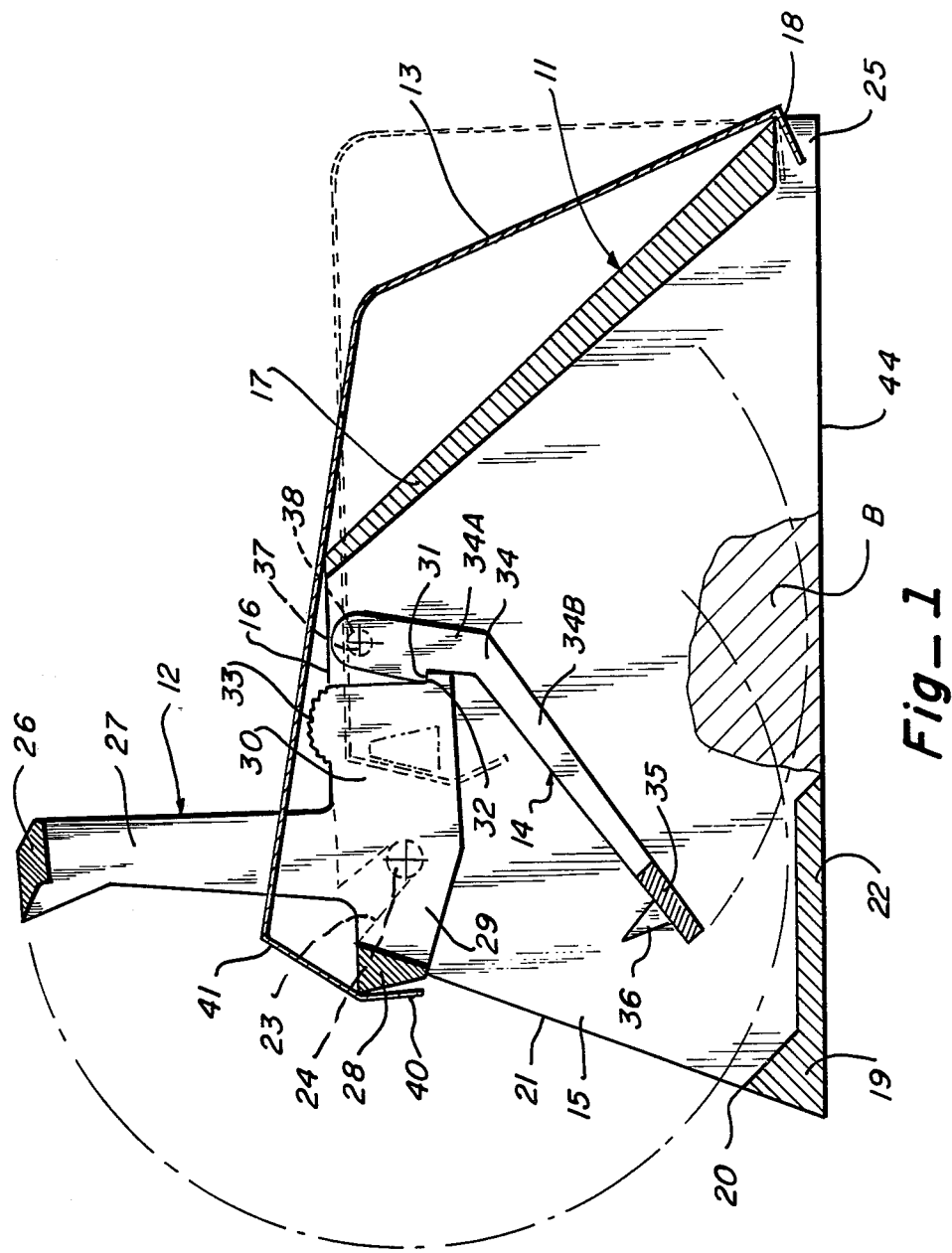

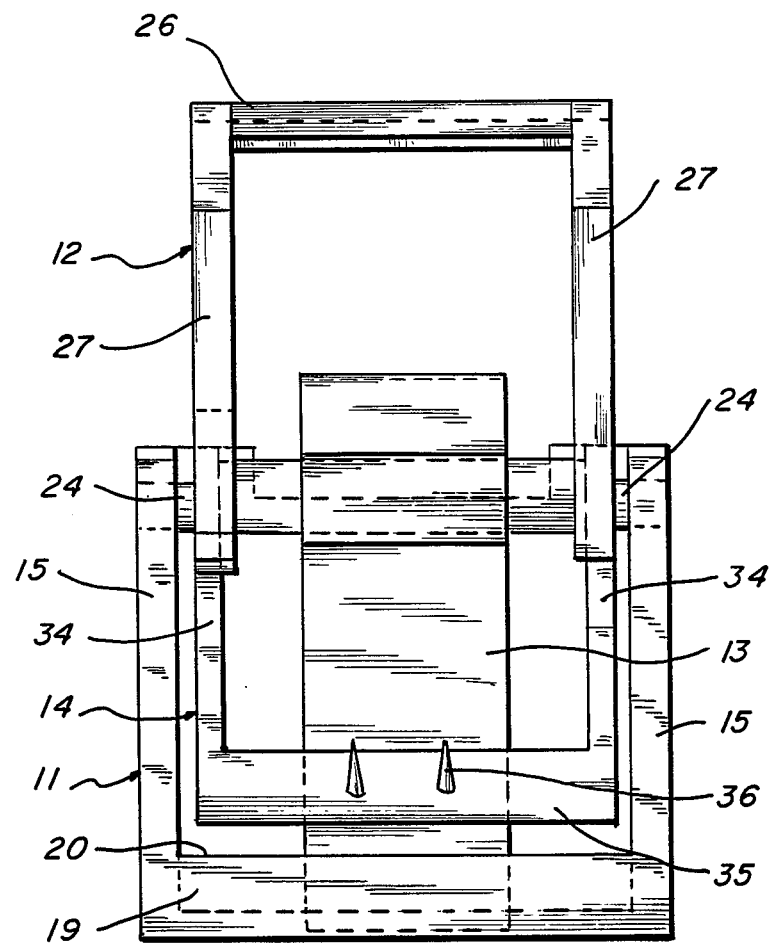
Fig_2

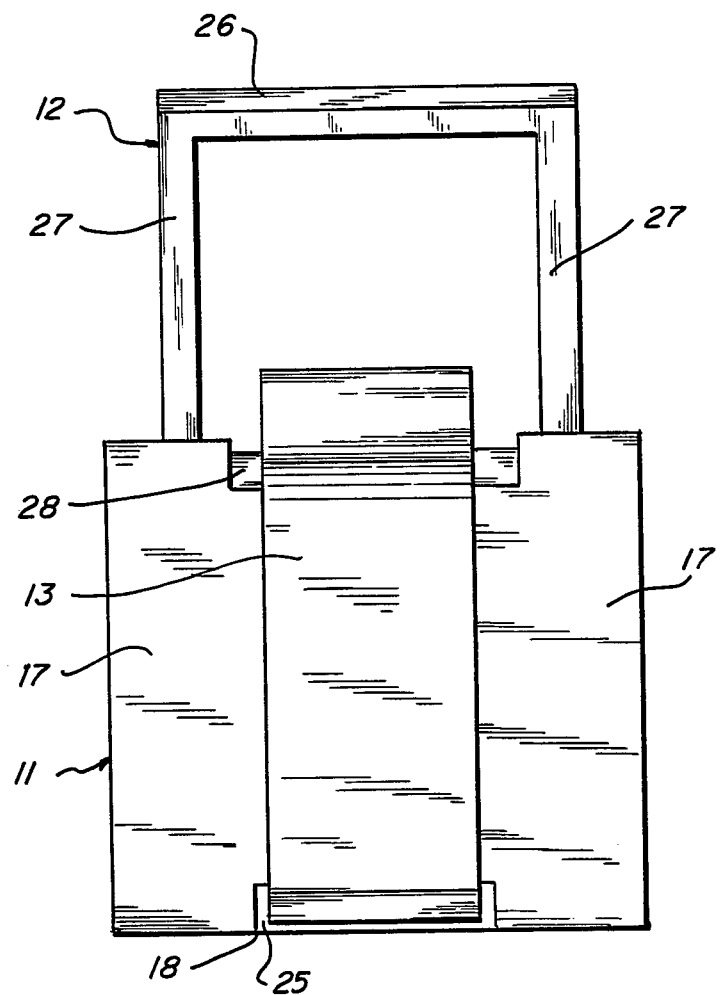
Fig_3

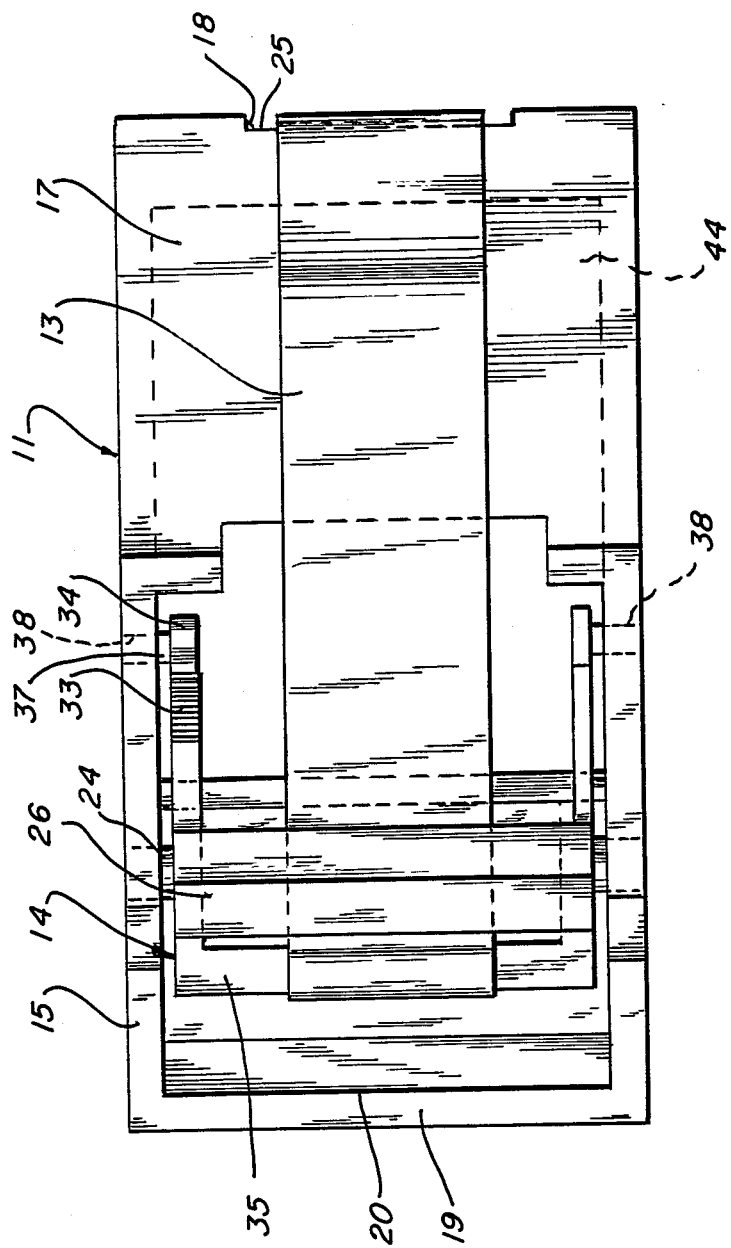

STRIKE TRAP FOR CATCHING MICE AND RATS

This is a continuation of application Ser. No. 824,004, filed Jan. 6, 1986 now abandoned.

The invention consists of a strike trap for rodents, particularly mice and rats. Many proposed mouse and rat traps exist which attempt to kill the animals with a spring-loaded element which swings downward.

A common construction has a spring-loaded swivelling striker which is held in a loaded position by a swiveling strut whose free end can be loosely connected to a mobile bait holder. Such traps are difficult to load and can be sprung without the animal being in a central position in the impact zone. Further, the trap uses a complicated bait holder with only space for small bait. Another important disadvantage is that after such traps have been in use for a while, they exude repellent odors which makes them badly suited for their purpose.

The main object of this invention has therefor been to design a strike trap with improved use characteristics, particularly a trap which provides greater enticement and the certain extermination of the animal. A specific aim has been to construct a trap which can be used with animals of differing size and which can employ larger a bait than is usual. Another object was to design a trap which is easy to load and prepare prior to setting it out.

These objects have been met by this new invention which provides a trap with satisfactory use characteristics which can be maintained on a long-term basis. It can be manufactured from indestructible, odorless materials which cannot be attacked by external forces or exude unwanted, repellent odors which hamper its enticement effect.

The invention will be described in further detail with reference to the drawings, where:

FIG. 1 shows a vertical cross-section along a longitudinal plan of one embodiment of the invention, while FIGS. 2, 3 and 4 show the front view, the back view and the top view of the trap, respectively.

The trap in the example has four main parts: A stand or support 11, a striker 12, a spring 13 and a release lever 14. Each of these parts and the linkage between them will be described below.

The support or frame 11 has two parallel plate-shaped side walls 15 which tapers upwardly and rearwardly towards the top edge 16. These side walls are connected by a transverse wall 17 towards the back and a transverse support 19 with an upwards-facing strike face 20 at the bottom at the front edge 21. The transverse support 19 extends into the base plate of the support 11 by a transverse plate 22. The purpose of this is to reduce the possibility of mispositioning the bait. At the top edge 16 along the front 21 there is a slot or groove 23 on each side wall 15 which runs obliquely downwardly towards the back from the top edge. The bottom of this groove can be rounded. It serves as a support for pivot pins 24 for the striker 12. This part of the design will now be described in more detail.

The transverse wall 17 at the back edge 18 has a notch 25 just in from the edge to hold the back end of the spring 13.

The striker 12 is mainly a U-shaped hoop with a strike pin 26 supported between two arms 27, each arm 27 having a pivot pin 24 on its free end. These are located in the groove 23 so that the strike pin 26 can swivel from an upper, loaded position to a lower position making firm contact with the animal's neck.

The arm 27 is shaped so that the strike pin 26 reaches just clears the strike face 20 on the transverse support 19, whilst it can pass through to the inside. The strike pin 26 and the strike face 20 will combine to kill an animal that enters the trap and releases the striker. The means of operation is as follows.

The striker 12 also has a transverse lug 28 which is supported by a short arm 29 on each side in such a way that the inner ends of the arms 29 are connected to their respective arms 27 by their respective pivot pins 24. The longitudinal axis for each arm 29 generally forms a right angle with the longitudinal axis of the adjoining arm 27. The transverse lug 28 forms a point of attachment or abutment for the spring 13 as outlined below.

On one side of the striker 12 opposite the arm 29 is positioned a protruding arm 30 which is designed to restrain the striker 12 when it is in a raised position using a locking lug 31 on the release lever 14.

The arm 30 is elongated and plate-shaped and has a notch 32 on its free end engaged by lug 31. The outer edge of the arm 30 protrudes slightly outwards forming the rounded lug 33 so that a good grip is obtained during loading.

The release lever 14 has been generally designed along the same lines as the striker 12, with two arms 34 which hold the release support 35. The latter can have teeth 36. On their free ends, the arms 34 are mounted so that they can swivel on their respective protruding axial pivots 37 which are located in holes 38 through each of the side walls 15 at the top. The holes 38 are about on a level with the grooves 23 and are located rearwardly of the grooves in relation to their common front edge 21. The arms 34 are bent, and include a short inner part 34A and a longer forward-facing outer part 34B holding the release support 35 at their free end.

The inner part of the arm 34 is furnished with the projection or a locking lug 31 which is inclined towards the striker 12 and the notch 32. The notch 32 and the projection 31 are designed so that they can be engaged when the striker 12 is swung upwards and the release lever 14 moves forward as far as possible. The striker 12 is now held locked in a raised, loaded position with the spring 13, as in FIG. 1, fully wound. The alternative or released position of the spring (i.e., after release) is shown by a broken line.

If the release support 35 is moved slightly, the projection or locking lug 31 will no longer be restrained by the notch 32 and release the striker 12. The teeth 36 prevent smaller animals from getting too far into the trap without touching the release support 35. Should the release support 35 be over-extended, this will lead to an increased load and an insecure locking position for the release lever 14.

The spring 13 is a band-shaped steel spring and is stretched between the lower edge of the transverse wall 17, over the side walls and forward to the transverse lug 28. Each end of the spring 13 has an inward bend so that a firm grip is made upon the respective end attachments. At the transverse lug 28 there is an outer bend 40 and an inner bend 41. These are adjusted so as to lie against each of the transverse lugs two sides according to whether it is in the loaded or released position. Apart from the spring 13, the other parts of the trap illustrated are made of plastic in the usual way. This alleviates corrosion and similar undesirable effects.

In use, the trap is placed over some bait B which is easily fitted into the open space 44 between the side walls 15 (FIG. 1). The bait or baits should not be attached to any part of the trap, but they should be located on a level surface before the trap is placed in position corresponding to the rest position of the striker after release. When the striker 12 is fixed in the loaded position as shown, the trap is ready for use.

In some cases, such as outdoor use, the trap can be anchored to a surface by a nail through a hole in the plate 22 (not shown).

The trap is only accessible for animals from one side in order to avoid unintentional release. This will increase the catch reliability and avoid injuring animals by a stray blow. As the striker will not be released unless animals enter the trap, this reduces unnecessary strain upon the construction following unintentional releases.

When released, the striker will hit the animals neck, almost regardless of the size of the animal. The blow will have a horizontal component which will pull the head away from the rest of the body and increase the probability of death.

As the invention alleviates the difficulty of fixing the bait onto any part of the trap, setting up is eased and it is possible to use bigger and more odourous baits than in existing traps. This also alleviates the deposit of bait remains on the trap which is not only unhygienic and reduce the enticement effect but may possibly impair the working mechanism.

The invention enables the trap to be loaded with one hand by pointing the trap downwards and pushing lever 14 forwardly. Emptying after a strike can be carried out in the same way as loading without having to touch the animal.

By using an alternative design, the striker 12 can be locked in a loaded position without requiring a locking element if one of the side walls 15 has a stop which allows the striker to swing past its neutral position relative to the action of the spring 13.

The spring 13 can thereby hold the striker in an open position. In this case, the release lever 14 must have a projection above the swing axis of the striker 12 so that it can move the striker past the neutral position.

By this design, the loading and setting of the trap becomes even more straightforward.

The spring 13, which alternatively can be a coil spring, can be fixed in a tensed position between the striker 12 and the support 11.

I claim:

1. A strike trap adapted for resting on a support surface for the capture and extermination of rodents, the strike trap having a frame means and a spring loaded striker means which can be released from a raised, loaded position by an activating element means connected to a swivelling release lever means, characterized in that the striker means is mounted on pivots adjacent to an open end of the frame means of said strike trap, the frame means includes a generally large opening in a surface adjacent to the support surface whereby a rodent bait sitting on said support surface is surrounded by said frame means, said release lever means includes a transverse element which protrudes into the area between the rodent bait in the large opening and said open end in the frame means adjacent to said striker means, and the striker means includes a band-shaped spring means which extends from an abuttment provided at one end of said frame means to a transverse leg mounted on said striker means whereby said striker means is spring biased to pivot downwardly when released from the loaded position so as to swing across the opening in said frame means so as to exterminate any rodent that enters into said opening to obtain said bait.

2. A strike trap according to claim 1, characterized in that the frame means has a transverse structural member extending at the edge of the end opening of said frame means opposite the edge where said striker means is pivoted, said transverse structural member is arranged also adjacent to the large opening in the surface of the frame means contacting said support surface and through which said rodent bait is protruding, and the striker means is pivotally mounted within said frame means and is arranged to swing downward past said transverse structural member.

3. A strike trap according to claim 1, in that the frame means consists of two side walls and a transverse structural member extends between the two sidewalls at the lower edge of the opening and opposite the location of the pivots provided for said strike means.

4. A strike trap according to claim 3 in that the striker means consists of two swivelling arms which hold a transverse active element at their free ends, the swivelling arms being mounted by said pivots to the respective side walls.

* * * * *